J. A. HALL.
Seed-Planter.
No. 49,104.
Patented Aug. 1, 1865.
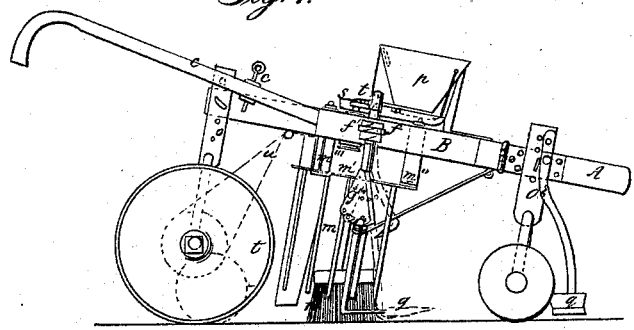
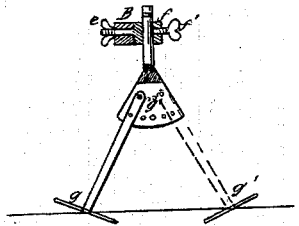
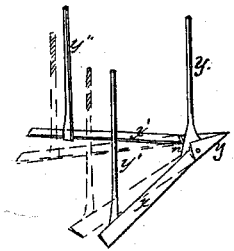
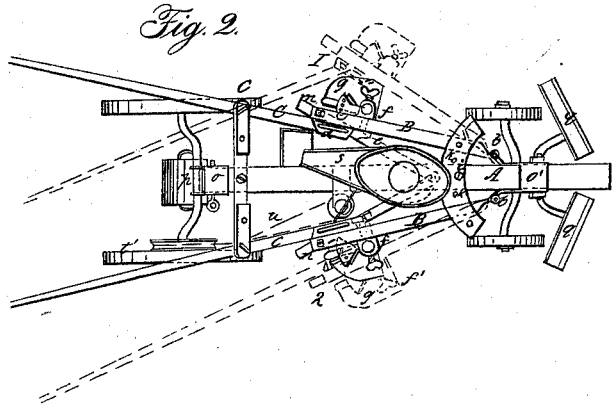
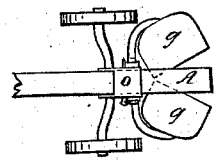
Witnesses:
Inventor:
Joel A. Hall

UNITED STATES PATENT OFFICE.

JOEL A. HALL, OF KEOKUK, IOWA.

IMPROVEMENT IN COTTON-CHOPPER, CULTIVATOR, AND DRILL.

Specification forming part of Letters Patent No. 49,104, dated August 1, 1865.

*To all whom it may concern:*

Be it known that I, JOEL A. HALL, of Keokuk, Lee county, Iowa, have invented a new and useful Improvement in Cotton-Choppers and Garden-Cultivators, of which the following is a full and clear description, reference being had to the accompanying drawings and letters of reference marked thereon.

My invention relates to a cotton-chopper and garden-cultivator designed for general garden cultivation, and also adapted to southern plantation cultivation.

In the accompanying drawings, Figure 1 represents an elevation, Fig. 2 represents a plan or top view, of my improvement in cotton-chopper and garden-cultivator. Fig. 3 is a sectional view of my adjusting-segment with the hoe attached. Fig. 4 is a perspective view of my strawberry-cutter attachment and weed-exterminator. Fig. 5 is a plan of the hoes attached to the forward end of the frame of the machine.

A is the frame of the machine, to which the various movable and adjustable parts are secured.

B and C are parts of adjustable handles, which are pivoted or hinged to frame A at $b$. The part of the handles C is pivoted to the stationary cross-piece D at $c$. At the inner extremity of handle C is fastened a pin, which slides freely in the slot in plate $d$, which is secured to handle B. To handle B is secured by clamp-nut $e$, the clamp-frame $f$, to which may be adjusted the hoe $g$, which is elevated or depressed as desired, and secured in position by the set-screw $h$.

$i$ is a segmental plate, perforated at $k$ $k$ for pin $l$, which secures the handle B at any desirable angle with the frame A.

To the under side of handles B are attached rakes $m$ $m$. Between the rakes $m$ $m$ is a brush, $n$, centrally located. It is secured to the frame A.

To the rear end of frame A, and also to the forward end, are the movable frames $o$ and $o'$, having at their lower extremity axles which bear the wheels usually employed. To the movable frame $o$ is firmly secured the roller $p$. Adjustably attached to the movable frame $o'$ are fenders $q$.

Near the center of the frame A is permanently fastened the hopper $r$, beneath which swings freely the distributing-spout $s$, which is vibrated laterally by means of crank $t$, crank $t$ being connected with a pulley upon the rear wheel, $t'$, by driving-belt $u$. From the plowshare $v$ of the strawberry-cutter, Fig. 4, depends the guide-blade $w$. Pivoted to the after end of plowshare $v$ are cutting-blades $x$ $x'$. Adjusting-rods $y$ $y'$ $y''$ are secured permanently to the plowshare and cutting-blades respectively.

The adjustments of the essential parts of my improvements are indicated by red lines.

For garden cultivation a small hand-cultivator may be used. For plantation cultivation a machine of large size, requiring one or more horses, may be employed.

The frame of the machine A is elevated from or depressed to the ground by pinning it as desired in the movable frames $o$ $o'$.

To the movable frame $o'$ is attached two adjustable fenders, $q$ $q$, their lower edges being but a short distance from the ground, that all obstructions—as stones, &c.—may be thrown aside.

When the machine is used for cutting cane, cotton, or cornstalks the hoes may be attached to sliding frame $o'$, as shown in Fig. 5.

Where it is desirable in drilling grains to increase or stop the flow of grain entirely, the outer end of distributing-spout $s$ may be elevated or depreesed, thus increasing or lessening the opening between the hopper and spout.

In the operation of hoeing, hoes $g$ $g$ may be adjusted so as to conform to inequalities of the surface or width of rows of products under cultivation, the adjustable handles B C may be firmly secured in position most desirable by pins $c$ and $l$, as shown at 1, Fig. 2, or the handles may be straightened and more independent of the balance of the machine, as shown at 2, Fig. 2. To still further facilitate the adjustment of the hoes, which may be of the shape shown or the diamond-pointed, (now in general use,) they are pinned in adjusting-segment $g'$, as shown in sectional view, Fig. 3.

In thinning out strawberries or weeds the strawberry-cutter shown in Fig. 4 is attached to the adjustable handles B C in place of hoes $g$ $g$. By cutting but one inch below the surface the vegetation operated upon is effectually killed.

The rakes $m\ m$ are pivoted to a standard, $m''$, which is attached to the frame A. The bar $m'$ to which the prongs of rake $m$ are secured, plays freely in the slotted hanger $m'''$, which is attached to the part B of the adjustable handles.

The purpose subserved by the brush $n$, which is centrally located between the rakes $m\ m$, is to protect the young vegetation from large clods or other heavy materials which the hoes throw up in hilling.

Having described my improved chopper and cultivator, I make the following claims:

1. In connection with the frame A, the adjustable handles B C, arranged and operated as above described, and for the purpose set forth.

2. The clamp-frame $f$, hoe $g$, and adjusting-segment $g'$, combined as above described.

3. The combination of the plow share or point $v$, guide-blade $w$, and pivoted wings $x\ x'$, substantially as and for the purpose set forth.

4. The plowshare $v$, cutting-blades $x$ and $x'$, and adjusting-rods $y\ y'\ y''$, arranged as above described, and for the purpose set forth.

5. The arrangement of the hopper $r$ and distributing-spout $s$ with the cultivator, in the manner and for the purpose described.

JOEL A. HALL.

Witnesses:
R. T. CAMPBELL,
C. SCHAFER.